United States Patent
Hikmet

(10) Patent No.: US 9,256,021 B2
(45) Date of Patent: Feb. 9, 2016

(54) LIGHTING APPARATUS

(75) Inventor: Rifat Ata Mustafa Hikmet, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 485 days.

(21) Appl. No.: 12/996,674

(22) PCT Filed: Jun. 22, 2009

(86) PCT No.: PCT/IB2009/052669
§ 371 (c)(1),
(2), (4) Date: Dec. 7, 2010

(87) PCT Pub. No.: WO2009/156939
PCT Pub. Date: Dec. 30, 2009

(65) Prior Publication Data
US 2011/0085319 A1    Apr. 14, 2011

(30) Foreign Application Priority Data
Jun. 27, 2008   (EP) .................................. 08104566

(51) Int. Cl.
*G02B 27/20* (2006.01)
*F21V 8/00* (2006.01)

(52) U.S. Cl.
CPC ............ *G02B 6/0041* (2013.01); *G02B 6/0043* (2013.01); *G02B 6/0073* (2013.01)

(58) Field of Classification Search
CPC ... G02B 6/0041; G02B 6/0043; G02B 6/0073
USPC ..................... 362/259, 84, 551, 553, 554, 556
See application file for complete search history.

(56) References Cited

U.S. PATENT DOCUMENTS

| | | | |
|---|---|---|---|
| 5,036,435 A | | 7/1991 | Tokuda et al. |
| 5,142,141 A | * | 8/1992 | Talat et al. ............... 250/227.15 |
| 5,606,634 A | * | 2/1997 | LeBihan ........................ 385/31 |
| 5,971,559 A | | 10/1999 | Ishikawa et al. |
| 6,102,559 A | * | 8/2000 | Nold et al. ..................... 362/558 |
| 6,361,180 B1 | * | 3/2002 | Iimura .......................... 362/616 |
| 7,497,608 B2 | | 3/2009 | Wheatley |
| 7,991,257 B1 | * | 8/2011 | Coleman ....................... 385/129 |
| 2002/0084749 A1 | | 7/2002 | Ayala et al. |
| 2004/0076395 A1 | | 4/2004 | Poisel et al. |
| 2004/0135494 A1 | | 7/2004 | Miyatake |
| 2006/0001036 A1 | | 1/2006 | Jacob et al. |
| 2006/0007301 A1 | | 1/2006 | Cho et al. |
| 2006/0007702 A1 | | 1/2006 | Hsieh et al. |
| 2006/0262243 A1 | | 11/2006 | Lester et al. |

(Continued)

FOREIGN PATENT DOCUMENTS

| | | |
|---|---|---|
| JP | 2004071357 A | 3/2004 |
| JP | 2004317470 A | 11/2004 |

(Continued)

*Primary Examiner* — Anh Mai
*Assistant Examiner* — Jessica M Apenteng

(57) ABSTRACT

A lighting apparatus includes a laser light modification unit for modifying laser light from a laser to form a modified light. The lighting apparatus further includes a first layer and an opposing second layer, where the laser light modification unit is between the first and second layers. One of these two layers includes a transparent material being transparent to the modified light. The laser light modification unit is configured to allow the modified light to pass through the transparent material.

16 Claims, 5 Drawing Sheets

(56) References Cited

U.S. PATENT DOCUMENTS

| | | |
|---|---|---|
| 2006/0268537 A1 | 11/2006 | Kurihara et al. |
| 2006/0275599 A1 | 12/2006 | Lefevre |
| 2007/0086184 A1 | 4/2007 | Pugh et al. |
| 2007/0221865 A1 | 9/2007 | Sohn et al. |
| 2008/0144333 A1 | 6/2008 | Gourlay |
| 2008/0285307 A1* | 11/2008 | Aylward et al. ............... 385/129 |

FOREIGN PATENT DOCUMENTS

| | | |
|---|---|---|
| JP | 2006053449 A | 2/2006 |
| JP | 2007258038 A | 10/2007 |
| JP | 2008108553 A | 5/2008 |
| WO | 2004099664 A1 | 11/2004 |
| WO | 2006007301 A1 | 1/2006 |

* cited by examiner

LIGHTING APPARATUS

FIELD OF THE INVENTION

The invention relates to a lighting apparatus, a lighting method and a lighting computer program. The invention further relates to a method of producing the lighting apparatus.

BACKGROUND OF THE INVENTION

US2006/0275599 A1 discloses a lighting apparatus having a layer of light-emitting diodes (LED) laminated between two layers of glass. This lighting apparatus is used for decorative as well as illumination purposes and can generate the impression of levitating light.

Such a lighting apparatus has the drawback that the illumination is limited by the power of the LEDs, i.e. it is not possible to use high power LEDs as the heat generated by LEDs often leads to the destruction of the glass.

SUMMARY OF THE INVENTION

It is an object of the present invention to provide a lighting apparatus, wherein the illumination can be increased.

In an aspect of the present invention a lighting apparatus is presented, wherein the lighting apparatus comprises:
  a laser light modification unit for modifying laser light to modified light,
  a laser for emitting laser light that is to be directed to the laser light modification unit,
  a first layer and an opposing second layer, wherein the laser light modification unit is arranged between the first layer and the second layer, wherein at least one of the first layer and the second layer comprises a transparent material being transparent to the modified laser light and wherein the laser light modification unit is adapted to allow the modified laser light to pass through the transparent material.

The invention is based on the idea that a lighting apparatus can be provided, in particular, for decorative as well as illumination purposes, if the illumination is provided by a combination of a laser and a laser light modification unit, wherein the laser light modification unit is arranged between a first layer and a second layer, wherein at least one of the first layer and the second layer comprises a transparent material being transparent to the modified light and wherein the laser light modification unit is adapted such that the modified light passes through the transparent material. Such a configuration does not need electrical leads to the laser light modification unit and does not need a LED, thereby not limiting the illumination by heat generation of a LED or of electrical leads.

The first layer is preferably a first plate and/or the second layer is preferably a second plate.

In an embodiment, the laser light modification unit comprises a luminescent material for emitting luminescent light being the modified light when illuminated by the laser light, wherein the transparent material is transparent to the luminescent light. This allows the laser light modification unit to modify the laser light to luminescent light, which leaves the space between the first layer and the second layer. Thus, the environment of the lighting apparatus is illuminated by the luminescent light being generated between the first layer and the second layer when the luminescent material is illuminated by the laser light.

The luminescent material is preferably a phosphor material, in particular an inorganic phosphor material such as SrSiON:Eu, SrBaSiO:Eu, SaSrSiN:Eu, CaS:Eu, (Sr0.5Ca0.5)S:Eu, SrS:Eu Sr, SiN:Eu, YAG or LuAG. It is also possible to use a pure organic phosphor material. The phosphor material can be dissolved in polymers. Furthermore, a luminescent polymer can also be used as luminescent material.

In an embodiment, the light modification unit comprises a non-absorbing light-scattering material, which scatters the laser light such that the collimation and/or the direction of travel are modified. This allows the laser light modification unit to modify the laser light so as to become, for example, less collimated and leave the space between the first layer and the second layer.

The lighting apparatus can comprise one or several laser light modification units and/or one or several lasers. Preferably, the lighting apparatus comprises at least two laser light modification units arranged at different locations between the first layer and the second layer. It is further preferred that the at least two different laser light modification units are adapted to modify the laser light differently. It is still further preferred that the laser and the at least two laser light modification units are arranged such that the at least two laser light modification units are simultaneously illuminatable by the laser light.

This allows to modify the laser light such that the modified light can leave the space between the first and second layer at different locations, i.e. the environment can be illuminated from different illumination origins. In particular, if the laser light modification units comprise a luminescent material, the environment can be illuminated with luminescent light from different locations.

It is further preferred that a protruding length of one of the at least two laser light modification units is different from a protruding length of the other of the at least two laser light modification units, wherein the protruding length is the length of protrusion into the laser light along a transverse direction of the laser light. This allows to simultaneously illuminate different laser light modification units, in particular luminescent materials located at different locations, with a single laser beam, wherein, for example, the environment can be illuminated from different illumination origins by using only a single laser.

It is further preferred that the first layer and the second layer are at least partially made of a transparent material, in particular, that the first layer and the second layer are completely made of a transparent material. It is further preferred that at least one of the first layer and the second layer is a glass layer. This generates the impression of a levitating light source at the locations of the laser light modification units.

In an embodiment, the first layer, the second layer and an intermediate transparent layer between the first layer and the second layer form a laminate, wherein the laser light modification unit is arranged in the intermediate transparent layer and wherein the intermediate transparent layer is transparent to the laser light. This forms a compact and robust lighting apparatus, wherein the laser light can still be directed to the laser light modification unit for modifying the laser light to modified light such that the modified light can pass through at least one of the first layer and the second layer for leaving the space between the first layer and the second layer.

It is further preferred that the laser, the first layer and the second layer are arranged such that the laser light travels between the first layer and the second layer to the laser light modification unit, wherein the laser light does not leave the space between the first layer and the second layer while traveling to the laser light modification unit. In an embodiment, in which the laser light modification unit comprises a luminescent material, the laser, the first layer and the second layer are arranged such that the laser light travels between the first layer and the second layer and does not pass through any of the first layer and the second layer.

Preferably, the intermediate transparent layer is transparent to the modified light, in particular to the luminescent light. The transparent layer can be a fluid like air or another gas such as argon or a liquid or the intermediate transparent layer can be a solid. It is further preferred that the intermediate transparent layer is made of resin. Acrylates, epoxy and vinyl monomers, which can be polymerized by high energy irradiation such as UV light or heat, can be used. It is also possible to use thermoplastic polymers such as acrylates and/or polyolefins as material for the intermediate transparent layer.

If the intermediate transparent layer is made of or comprises a fluid, a casing is preferably formed between the first layer and the second layer, which includes the fluid for forming the intermediate transparent layer. Preferably, two opposing walls of the casing are formed by the first layer and the second layer.

It is further preferred that the lighting apparatus comprises a waveguide for guiding the laser light to the laser light modification unit. Thus, the laser light is directed to the laser light modification unit by guiding the laser light to the laser light modification unit using the waveguide. The waveguide is preferably an optical fiber or a flat waveguide. The use of a waveguide is advantageous because once the laser light is coupled into a wave guide, it is confined to the waveguide and therefore its path and the size of the laser light, in particular the laser beam, can be controlled with ease by the waveguide.

In an embodiment, the first layer, the second layer and an intermediate transparent layer between the first layer and the second layer form a laminate, wherein the waveguide is arranged in the intermediate transparent layer. Also in this embodiment, the intermediate transparent layer can be a fluid or a solid and is preferably made of resin. This forms a compact and robust lighting apparatus, wherein the probability of misalignment of the laser light with respect to the laser light modification unit is reduced. Preferably, the waveguide is a waveguide without a cladding, wherein the refractive index of the intermediate transparent layer is chosen such that waveguiding is enabled within the waveguide. Thus, the laser light can be guided to the laser light modification unit, without the need of a cladding. In this embodiment, the waveguide is preferably an optical fiber or a flat waveguide without a cladding, wherein the cladding of a waveguide is one or more layers of material of lower refractive index in intimate contact with a core material of higher refractive index. In a preferred embodiment, the laser light modification unit comprises a luminescent material located on the wave guide, wherein the luminescent material emits luminescent light as modified light when illuminated by the laser light guided within the optical waveguide.

It is further preferred that the waveguide comprises a cladding, wherein the cladding comprises at least one opening being a laser light modification unit for allowing the laser light to leave the waveguide and pass through the transparent material of at least one of the first layer and the second layer. In particular, the cladding comprises at least one opening being a laser light modification unit for allowing the laser light to partially leave the waveguide and pass through the transparent material of at least one of the first layer and the second layer. In this embodiment, the waveguide is preferably an optical fiber or a flat waveguide comprising a cladding. The laser light can be, for example, blue light, which is coupled out of the waveguide at the at least one opening, said coupling out of the laser light causing the direction and/or collimation of the laser light to be changed and the outcoupled light, being the modified light, passing through the transparent material of at least one of the first layer and the second layer for leaving the lighting apparatus and illuminating the environment.

It is further preferred that the waveguide comprises a cladding, which cladding comprises at least one opening, wherein a luminescent material is located at the at least one opening, and the at least one opening and the luminescent material form a laser light modification unit, wherein the luminescent material is adapted for emitting luminescent light, being the modified light, when illuminated by the laser light, wherein the opening and the luminescent material are adapted such that the luminescent light passes through the transparent material of least one of the first layer and the second layer. In this embodiment, the waveguide is preferably an optical fiber or a flat waveguide comprising a cladding. The laser light is coupled out of the waveguide at the at least one opening and converted into luminescent light being the modified light, wherein by coupling out the laser light and converting it into luminescent light the direction and the wavelength of the light have been changed. The luminescent light passes through the transparent material of at least one of the first layer and the second layer for leaving the lighting apparatus and illuminating the environment.

In a preferred embodiment, the lighting apparatus comprises at least two waveguides, which are independently addressable by the laser. It is further preferred that the lighting apparatus comprises at least two groups of laser light modification units, which are independently addressable by the laser. This allows modifying the illumination configuration by addressing different waveguides and/or different groups of laser light modification units. For example, at least one laser and the laser light modification units can be arranged such that the laser light modification units of a group can be illuminated simultaneously by the laser light, wherein by changing, for example, the direction of the laser light or by coupling the laser light into another waveguide, different groups are addressable.

In a preferred embodiment, the lighting apparatus comprises red, blue and green emitting lasers. It is further preferred that the light from the lasers can be coupled into one or several waveguides, wherein the waveguides comprise light modification units for coupling out the laser light by changing its direction and/or collimation, the outcoupled light being the modified light.

It is further preferred that the lighting apparatus comprises a crack detection unit for detecting a crack in at least one of the first layer and the second layer and a control unit for controlling the laser, wherein the control unit is adapted to switch the laser off if the crack detection unit has detected a crack in at least one of the first layer and the second layer. This protects the environment from laser light which could erroneously leave the lighting apparatus.

The crack detection unit may comprise a conducting element, like a conducting layer or a conducting strip, placed on or integrated in at least one of the layers, in particular on top of at least one of the layers. The crack detection unit may further comprise an electronic circuit measuring the resistance of the conducting element. Upon crack formation the resistance of the conducting element is altered and it is detected by the electronic circuit, which automatically switches the laser light off.

In a further aspect of the present invention, a method of producing a lighting apparatus is presented, wherein the method of producing a lighting apparatus comprises the following steps:

providing a laser light modification unit for modifying laser light to modified light, a laser for emitting laser light that is to be directed to the laser light modification unit and a first layer and an opposing second layer, wherein at least one of the first and the second layer comprises a transparent material being transparent to the modified light, wherein the laser light modification unit is adapted to allow the modified light to pass through the transparent material, arranging the laser light modification unit, the laser, the first layer and the second layer such that the laser light modification unit is arranged between the first layer and the second layer, that the laser light is directable to the laser light modification unit for generating modified light and that the modified light is allowed to pass through the transparent material.

In a further aspect of the present invention a lighting method for operating a lighting apparatus is presented, wherein the lighting apparatus comprises:

a laser light modification unit for modifying laser light to modified light, a laser for emitting laser light that is to be directed to the laser light modification unit, a first layer and an opposing second layer, wherein the laser light modification unit is arranged between the first layer and the second layer, and at least one of the first and the second layer comprises a transparent material being transparent to the modified light and wherein the laser light modification unit is adapted to allow the modified light to pass through the transparent material, wherein the lighting method comprises the steps of:

emitting laser light by the laser, directing the laser light to the laser light modification unit, modifying laser light to modified light by the laser light modification unit such that the modified light passes through the transparent material.

BRIEF DESCRIPTION OF THE DRAWINGS

These and other aspects of the invention will be apparent from and elucidated with reference to the embodiments described hereinafter. In the following drawings:

FIG. 1 shows schematically and exemplarily a sectional view of a lighting apparatus 1 comprising laser light modification units 2, which modify laser light 3 to modified light, which is not shown in FIG. 1. The laser light modification units 2 are arranged within a first layer 5 and an opposing second layer 6. In this embodiment, the laser light modification units 2 are attached to a surface of the first layer 5 facing the second layer 6. The lighting apparatus 1 further comprises a laser 4 for emitting laser light 3, which is directed to the laser modification units 2.

At least one of the first layer 5 and the second layer 6 comprises a transparent material being transparent to the modified light, wherein the laser light modification units 2 are adapted to allow the modified light to pass through the transparent material. In this embodiment, the first layer 5 and the second layer 6 are glass layers, in particular glass plates. Furthermore, in this embodiment the laser light modification units are luminescent materials, in particular phosphor materials, which emit luminescent light when illuminated by the laser light 3. In another embodiment, the laser light modification units may also be just light outcoupling points such as non-absorbing light scatter points at a waveguide for guiding the laser light to the laser light modification units, i.e. e.g. to the out-coupling points.

The laser light 3 is directed to the laser light modification units 2 such that the direct unmodified laser light 3 remains between the first layer 5 and the second layer 6 and does not pass through any of the first layer 5 and the second layer 6.

The laser light modification units 2 are arranged at different locations between the first layer 5 and the second layer 6 and at least two of these laser light modification units 2 are adapted to modify the laser light differently. In this embodiment, at least two different luminescent materials are used as laser light modification units 2, which emit luminescent light having different wavelengths.

Figure 1:
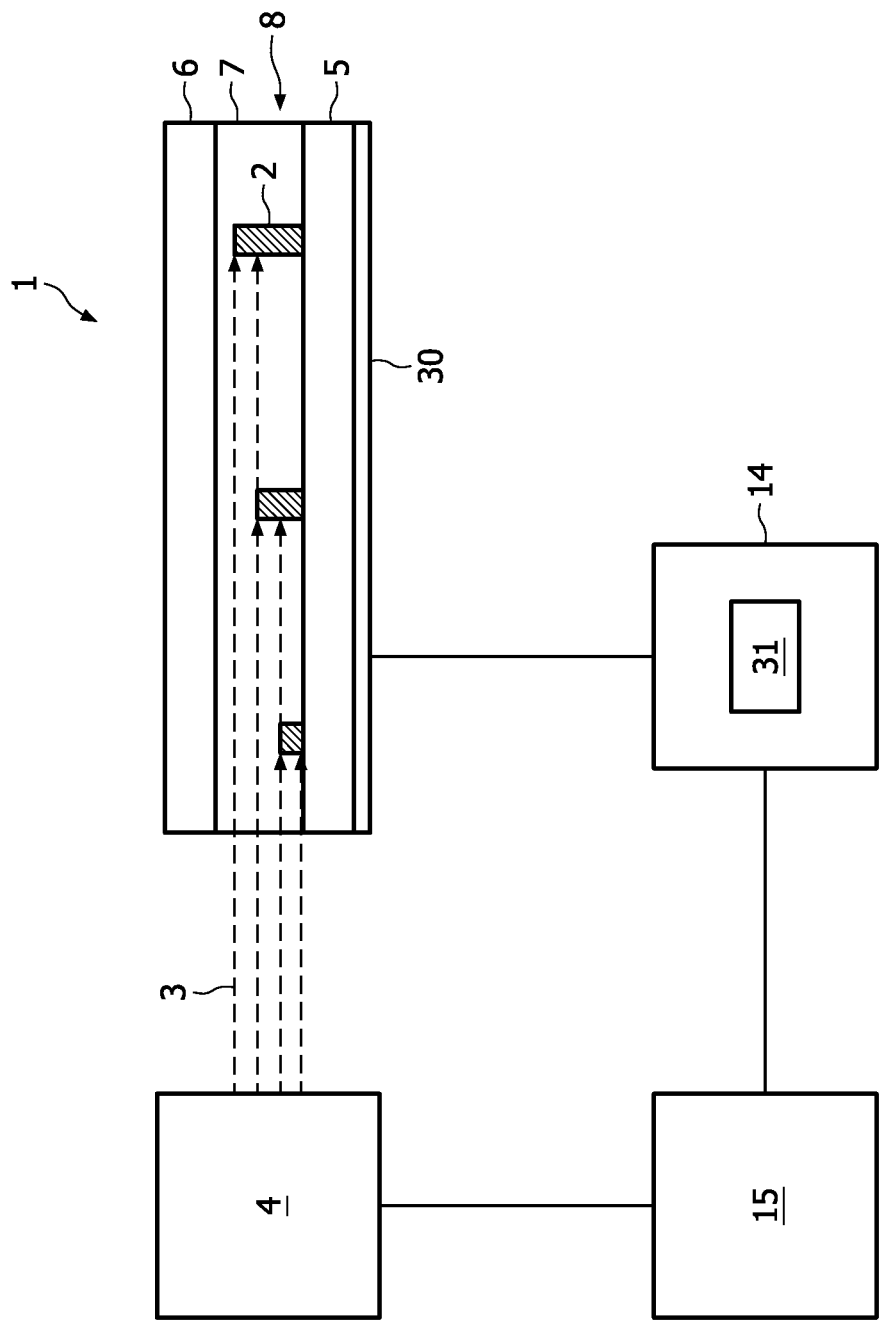
FIG. 1 shows schematically and exemplarily a sectional view of an embodiment of a lighting apparatus.

The laser light modification units 2 are arranged such that they are simultaneously illuminatable by the laser light 3. In particular, the protruding lengths of the laser light modification units 2 are different, wherein the laser light modification unit 2 having the shortest distance to the laser 4 has the smallest protruding length and the laser light modification unit 2 having the largest distance to the laser 4 has the largest protruding length. The protruding length is the length of protrusion into the laser light 3 along a transverse direction of the laser light 3. In FIG. 1, the protruding length of the laser light modification units 2 is their vertical length.

The first layer 5, the second layer 6 and an intermediate transparent layer 7 between the first layer 5 and the second layer 6 form a laminate 8, wherein the laser light modification units 2 are arranged in the intermediate transparent layer 7 and wherein the intermediate transparent layer 7 is transparent to the laser light 3. The intermediate transparent layer is, in this embodiment, air or another gas such as argon. It may also be just a liquid. However, it may also be made of resin. Preferably, the intermediate transparent layer 7 is also transparent to the luminescent light emitted, in this embodiment, by the laser light modification units 2.

The lighting apparatus 1 further comprises a crack detection unit 14 for detecting a crack in at least one of the first layer 5 and the second layer 6. The lighting apparatus 1 further comprises a control unit 15 for controlling the laser 4, wherein the control unit 15 is adapted to switch the laser 4 off if the crack detection unit 14 has detected a crack in at least one of the first layer 5 and the second layer 6.

The crack detection unit 14 comprises a conducting element 30, like a conducting layer or a conducting strip, placed on or integrated in at least one of the layers 5, 6, in particular on top of at least one of the layers 5, 6. The crack detection unit 14 further comprises an electronic circuit 31 measuring the resistance of the conducting element 30. Upon crack formation, the resistance of the conducting element 30 is altered and this is detected by the electronic circuit 31, which automatically switches the laser light off.

The laser 4 can be a single laser only or can be constituted of several lasers. Furthermore, the laser 4 can comprise optical elements for modifying and/or directing the laser light 3 to the laser light modification units 2.

The laser light is preferably a collimated laser beam or the laser light can be formed by several collimated laser beams for illuminating the laser light modification units, in particular for pumping the luminescent material, which are preferably composed of phosphor particles, to induce emission, in particular fluorescence, from them.

The laser, which can be constituted of several lasers or which can be a single laser only, is preferably adapted to emit blue, violet or ultraviolet light.

The surface of the first layer 5, on which the laser light modification units 2 are placed in the embodiment schematically shown in FIG. 1, can be the surface of double-glazing glass.

Figure 2:
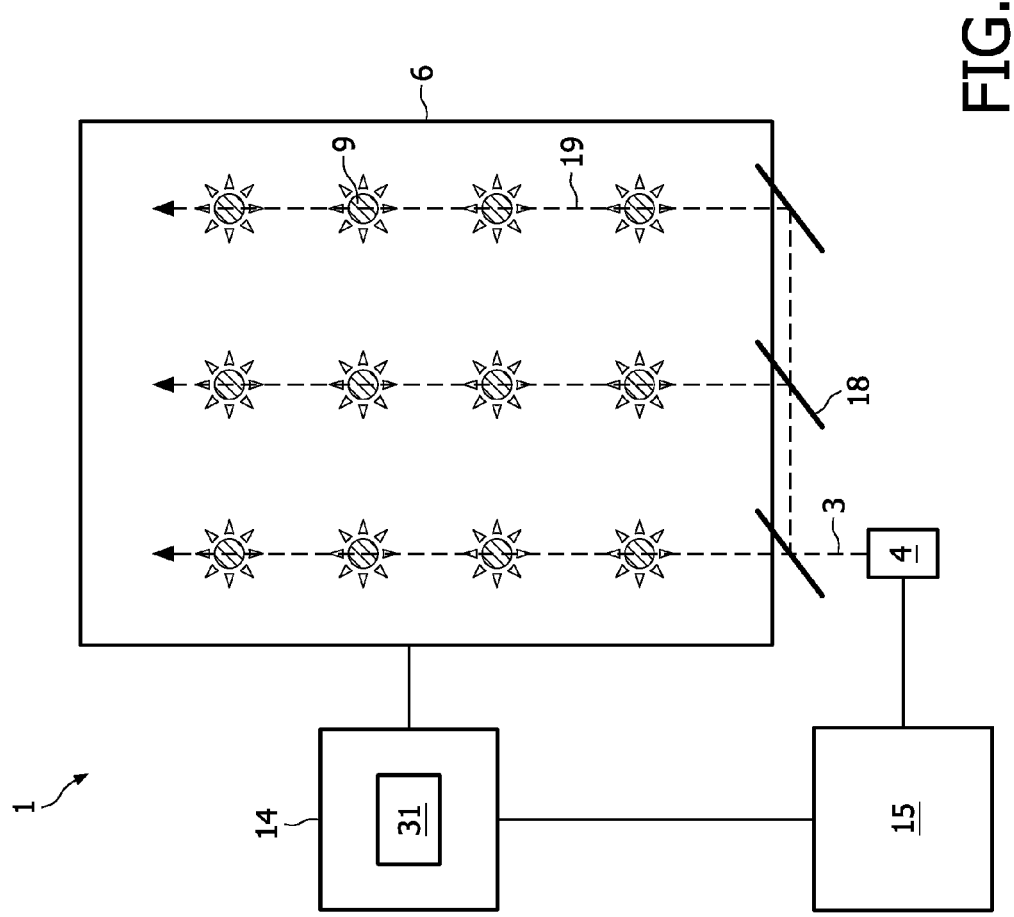
FIG. 2 shows schematically and exemplarily a top view of the embodiment of a lighting apparatus.

FIG. 2 shows schematically and exemplarily a top view of the lighting apparatus 1 which is schematically and exemplarily shown in FIG. 1.

As can be seen in FIG. 2, the lighting apparatus 1 comprises several beam splitting elements, in particular, beam splitting mirrors, in order to divide the laser light 3 of the laser 4 into several laser beams 19, wherein each of the laser beams 19 illuminates a row of laser light modification units such that they emit modified light 9, which passes through the second layer 6 for illuminating the environment.

The beam splitting elements 18 can be any type of beam splitting element, for example, as already mentioned above, a beam splitting mirror. These beam splitting elements can be active or passive components. Instead of using the laser 4 and the beam splitting elements, several lasers can be used, wherein each laser is adapted to emit laser light for illuminating laser light modification units arranged along a line as, for example, shown in FIG. 2.

Although the laser light modification units 2 of the lighting apparatus 1, which are schematically shown in FIG. 1, have different heights, i.e. different protruding lengths, it is also possible to keep the height of the laser light modification units 2, in particular of the luminescent material, which are preferably phosphor particles, constant and let the laser light impinge at an angle with respect to the surface on which the laser light modification units 2 are placed, in order to illuminate the laser light modification units 2, i.e., in an embodiment, the laser light does not travel parallel to this surface.

The laser light modification units 2 are preferably luminescent materials, in particular phosphor particles, which preferably emit red light, blue light and/or green light, if illuminated by the laser light 3, in particular, if the laser light is violet or blue light. The laser light modification units may also be just light outcoupling points such as non-absorbing light-scatter points, in particular, if the wavelength of the laser light does not need to be converted. For example, if red, blue and green lasers are used, a colored appearance can be obtained when laser light is coupled out without wavelength conversion.

Figure 3:
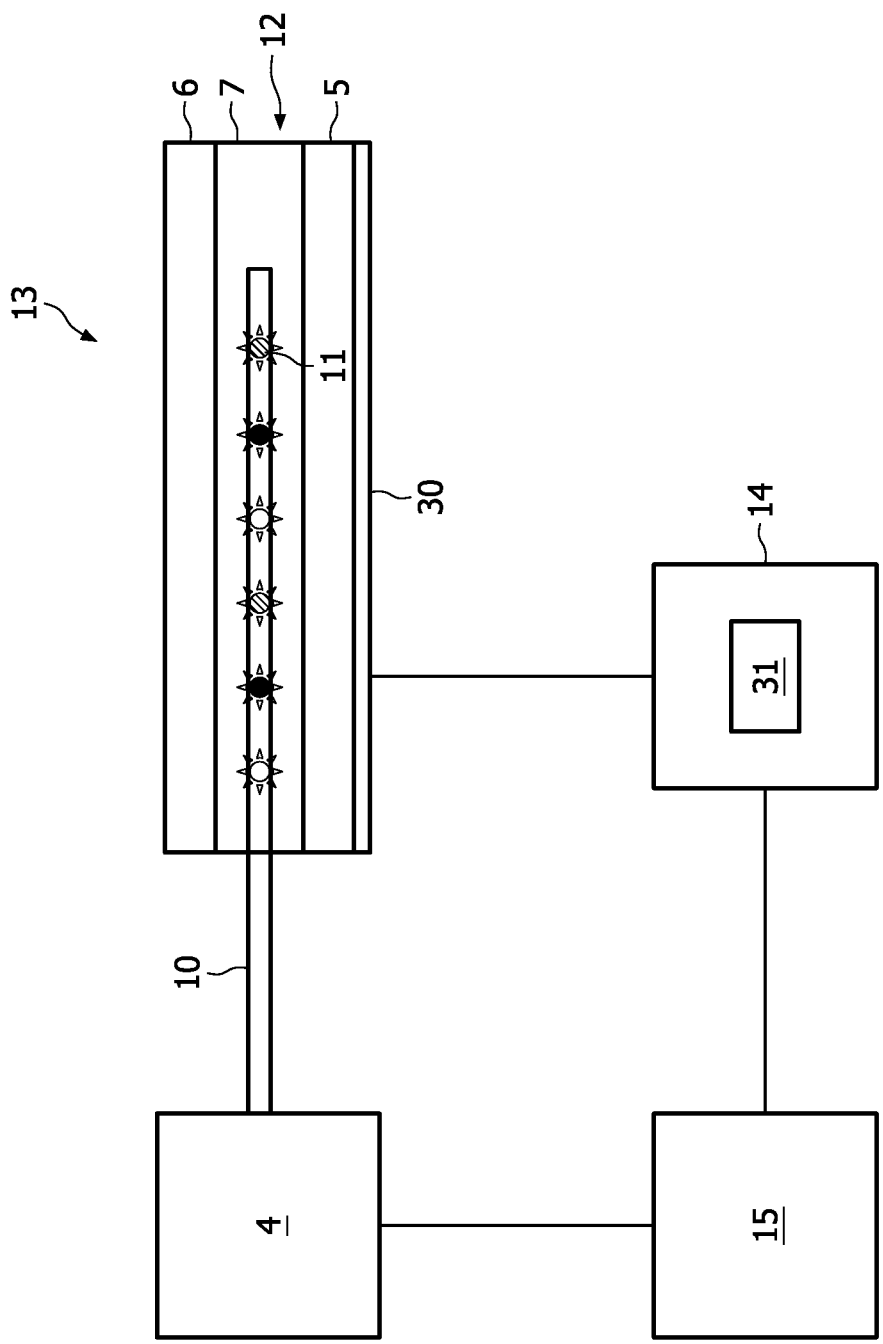
FIG. 3 shows schematically and exemplarily a sectional view of another embodiment of the lighting apparatus.

A further embodiment of a lighting apparatus 13 is schematically and exemplarily shown in a sectional view in FIG. 3.

Also the lighting apparatus 13 comprises a laser 4, a control unit 15 and a crack detection unit 14. Furthermore, the lighting apparatus 13 comprises a laminate 12 formed by a first layer 5, a second layer 6 and an intermediate transparent layer 7, which have been described above already. In this embodiment, the lighting apparatus comprises further a waveguide 10 for guiding the laser light to the laser light modification units 11. The waveguide 10 is arranged in the intermediate transparent layer 7 and is, in this embodiment, an optical fiber. In addition to or instead of an optical fiber, a flat waveguide can also be used as a waveguide. Using a flat waveguide has the advantage that the refractive index difference is present only in the direction perpendicular to the surfaces and hence the lighting apparatus appears to be clear in a direction perpendicular to the first layer and the second layer.

In an embodiment, the waveguide, in particular the optical fiber and/or the flat waveguide, comprises a cladding, wherein the cladding comprises several openings being laser light modification units for allowing the laser light to leave the waveguide and pass through the transparent material of at least one of the first layer 5 and the second layer 6. Preferably, the cladding has been removed at different locations before forming the laminate 12 comprising the first layer 5, the second layer 6 and the intermediate transparent layer 7, in which the waveguide 10 is included.

In a further embodiment, the waveguide, in particular the optical fiber and/or the flat waveguide, comprises a cladding, wherein the cladding comprises several openings and wherein luminescent material is located at the several openings. In this embodiment, the several openings and the luminescent material located at the several openings form laser light modification units 11, wherein the luminescent material is adapted for emitting luminescent light, being the modified light, when illuminated by the laser light. The openings and the luminescent material are adapted such that the luminescent light transmits through the transparent material of at least one of the first layer 5 and the second layer 6. Also these openings are preferably formed by removing the cladding of the waveguide at different locations before forming the laminate from the first layer, the second layer and the intermediate transparent layer in which the waveguide is included.

In a further embodiment, the waveguide 10 is a waveguide, in particular, an optical fiber and/or a flat waveguide, without a cladding, wherein the refractive index of the intermediate transparent layer 7 is chosen such that waveguiding is enabled within the waveguide. In this embodiment, preferably luminescent material is located at different positions on the waveguide, which emits luminescent light when illuminated by the laser light.

Also in these embodiments, which comprise a waveguide in the intermediate transparent layer, the intermediate transparent layer is preferably a resin.

If the intermediate transparent layer 7 consists of air, it is not necessary to use a cladding on the waveguide. However a cladding may be used. If the intermediate transparent layer 7 is made of a resin, which has a lower refractive index than the waveguide without cladding, the resin functions as a cladding.

If the waveguide is a flat waveguide, the edges of the waveguide can be provided with a reflector or the angle at which laser light is coupled in can be chosen such that the laser light cannot leave the waveguide by edge reflections.

The lighting apparatus can comprise one or several waveguides 10.

Figure 4:
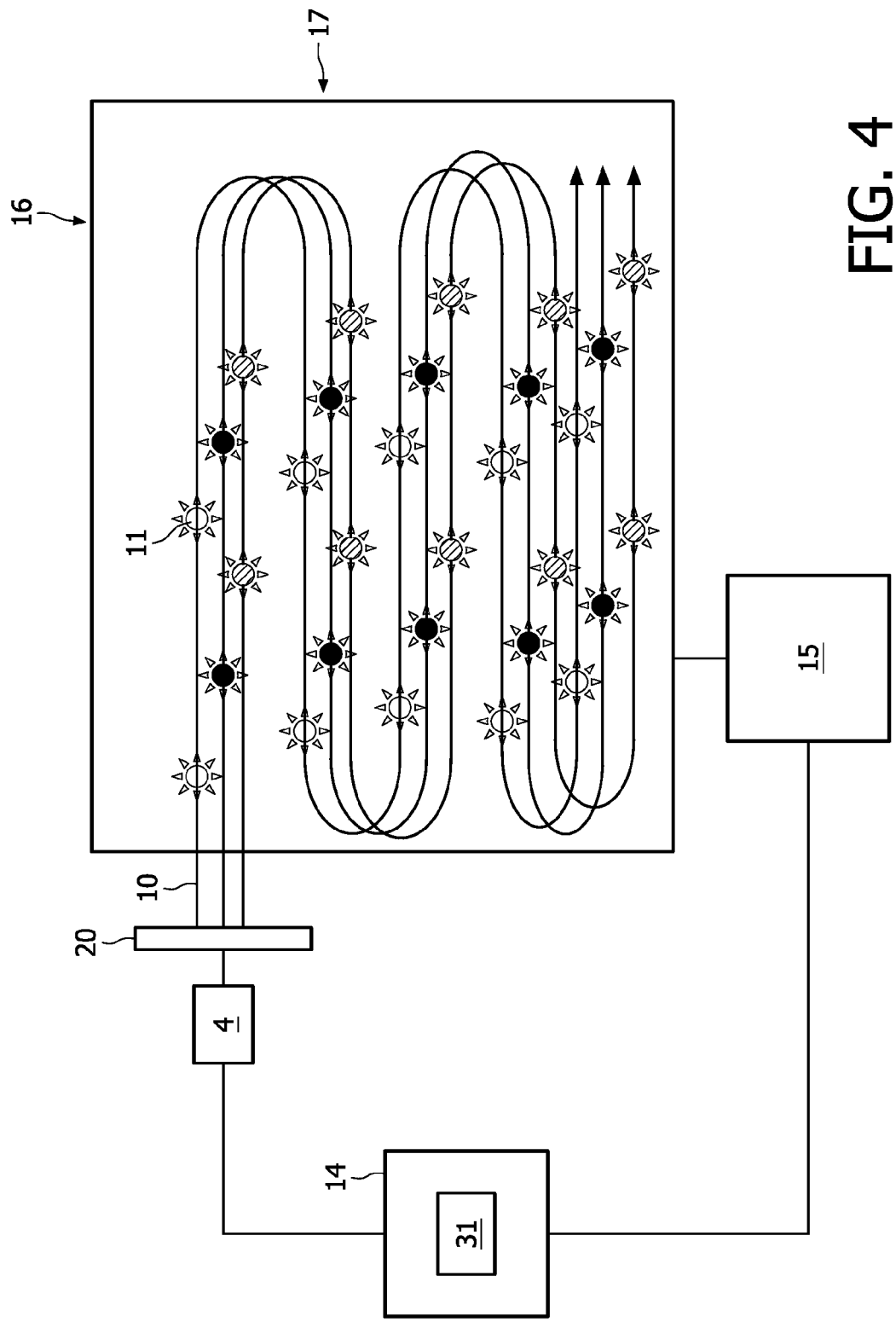
FIG. 4 shows schematically and exemplarily a top view of another embodiment of the lighting apparatus.

FIG. 4 shows schematically and exemplarily a top view of a lighting apparatus comprising waveguides within the intermediate transparent layer between the first layer and the second layer, wherein the waveguides, the intermediate transparent layer, the first layer and second layer are preferably similar to the waveguide, the intermediate transparent layer, the first layer and the second layer described above. The lighting apparatus 17 schematically and exemplarily shown in FIG. 4 comprises three waveguides 10 arranged within the intermediate transparent layer between the first layer and the second layer, thus forming a laminate 16. Laser light modification units 11 are arranged along the waveguides 10, in particular, by forming openings in a cladding of optical fibers with or without luminescent material and/or by using optical fibers without cladding, wherein the refractive index of the intermediate transparent layer is adapted such that waveguiding is possible within the optical fibers and wherein preferably luminescent material is placed at locations on the optical fibers. In an embodiment, the laser light modification units 11 are locations in the waveguide, wherein the locations comprise light scattering centers where the laser light can partially change its direction and/or its collimation to exit the waveguide and to leave the space between the first layer and the second layer. The laser 4 emits laser light, which is coupled into the several waveguides 10 by the coupling unit 20. Preferably, the coupling unit 20 is adapted such that the laser light can be coupled into one or several of the waveguides 10 such that the waveguides 10 are independently addressable, i.e. the coupling unit 20 is preferably an optical switch. Also in this case, several lasers can be used for addressing the different waveguides independently, wherein the several lasers are preferably capable of emitting red, blue and green laser light. The coupling unit 20 can also comprise static beam splitters for distributing the laser light to the different waveguides.

Figure 5:
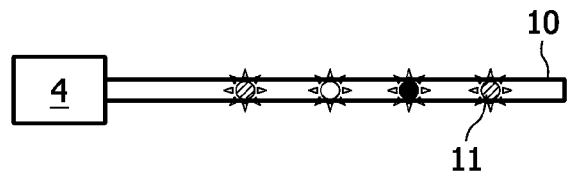
FIG. 5 shows schematically and exemplarily a laser with an optical fiber comprising openings and preferably luminescent material for forming laser light modification units.

FIG. 5 shows schematically and exemplarily one of the waveguides 10 comprising the laser light modification units 11 and being coupled to the laser 4 separately from possible further elements like the first layer, the second layer and the intermediate transparent layer.

Figure 6:
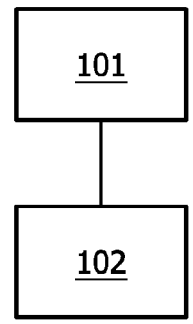
FIG. 6 shows exemplarily a flowchart illustrating an embodiment of a method of producing a lighting apparatus.

In the following, an embodiment of a method of producing a lighting apparatus will be described with reference to a flowchart shown in FIG. 6.

In step 101, laser light modification units for modifying laser light to modified light, a laser for emitting laser light that is to be directed to the laser light modification units and a first layer and an opposing second layer are provided, wherein at least one of the first and second layer comprises a transparent material being transparent to the modified light and wherein the laser light modification unit is adapted to allow the modified light to pass through the transparent material. In an embodiment, the laser light modification units are provided by providing an optical fiber comprising a cladding and by removing the cladding at different locations, wherein preferably luminescent material is placed at the locations where the cladding has been removed for generating openings. In another embodiment, an optical fiber without a cladding is provided and preferably luminescent material is placed at different locations on the optical fiber, wherein, in this case, a transparent material for forming an intermediate transparent layer, in which the optical fiber is to be located, is provided, wherein the refractive index of the transparent material is chosen such that waveguiding is possible within the optical fiber.

In step 102, the laser light modification unit, the laser, the first layer and the second layer are arranged such that the laser light modification unit is arranged between the first layer and the second layer, that the laser light is directable to the laser light modification unit for generating modified light and that the modified light is allowed to pass through the transparent material. In an embodiment, luminescent material is placed on a surface of the first layer or the second layer which faces the other of the first layer and the second layer. More preferably a laminate is formed comprising the first layer, the second layer and an intermediate transparent layer made of the transparent material located between the first layer and the second layer. In a further embodiment, a waveguide, in particular an optical fiber, is arranged in the intermediate transparent layer for guiding laser light from the laser to the laser light modification unit.

Figure 7:
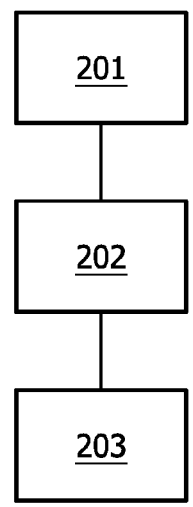
FIG. 7 shows exemplarily a flowchart illustrating an embodiment of a lighting method for operating a lighting apparatus.

An embodiment of a lighting method for operating a lighting apparatus will exemplarily be described hereinafter with reference to a flowchart shown in FIG. 7.

In step 201, the laser 4 emits laser light, which is directed to the laser light modification unit in step 202, and in step 203 the laser light is modified to modified light by the laser light modification unit such that the modified light passes through the transparent material.

Although in the above described embodiments certain configurations of lasers, beam paths and laser light modification units have been presented, the invention is not limited to these configurations. For example, the laser light modification units can be arranged in another configuration and the lighting apparatus can comprise one or more lasers and optical elements for directing the laser light such that the laser light modification units are illuminated by the laser light, wherein the laser light modification units modify the laser light and wherein the modified light passes through a transparent material of at least one of the first layer and the second layer.

Other variations to the disclosed embodiments can be understood and effected by those skilled in the art in practicing the claimed invention, from a study of the drawings, the disclosure, and the appended claims.

The figures are schematically and exemplarily only and not true to scale. For example, the ratio between the thickness of the conducting element 30 and the thickness of the first layer 5 is preferably much smaller than shown in, for example, FIG. 1.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:
1. A lighting apparatus comprising:
laser light modification units configured to modify laser light to modified light, wherein a first laser light modification unit of the laser light modification units comprises a first luminescent material for emitting a first luminescent light and a second laser light modification unit of the laser light modification units comprises a second luminescent material for emitting a second luminescent light, the first luminescent light and the second luminescent light being the modified light when illuminated by the laser light;
a laser for emitting the laser light that is to be directed along a longitudinal axis of the lighting apparatus to the first and second luminescent material of the laser light modification units;
a first layer and an opposing second layer; and
an intermediate transparent layer disposed between the first layer and the second layer,
wherein the laser light modification units are arranged between the first layer and the second layer, wherein at least one of the first layer and the second layer comprises a transparent material being transparent to the modified light, wherein the laser light modification units are configured to allow the modified light to pass through the transparent material, said laser light modification units being arranged at different locations between the first layer and the second layer, wherein only the first luminescent material and the second luminescent material protrude in a transverse direction transverse to the laser light and to the longitudinal axis of the lighting apparatus, and wherein a first protruding length of the first luminescent material is different from a second protruding length of the second luminescent material, the first protruding length and the second protruding length being a length of protrusion into the laser light along the transverse direction of the laser light, and wherein the laser and the first and second luminescent material of the laser light modification units are arranged such that the laser light modification units are simultaneously illuminatable by the laser light, and wherein the intermediate transparent layer comprises one of gas and liquid.

2. The lighting apparatus of claim 1, wherein the first and second luminescent material are different so that said laser light modification units modify the laser light differently.

3. The lighting apparatus of claim 1, wherein the first layer, the second layer and the intermediate transparent layer disposed between the first layer and the second layer form a laminate, wherein the laser light modification units are arranged in the intermediate transparent layer, and wherein the intermediate transparent layer is transparent to the laser light.

4. The lighting apparatus of claim 1, further comprising a waveguide for guiding the laser light to the laser light modification units.

5. The lighting apparatus of claim 4, wherein the first layer, the second layer and the intermediate transparent layer between the first layer and the second layer form a laminate, wherein the waveguide is arranged in the intermediate transparent layer.

6. The lighting apparatus of claim 5, wherein the waveguide is a waveguide without a cladding, and wherein a refractive index of the intermediate transparent layer is chosen such that waveguiding is enabled within the waveguide.

7. The lighting apparatus of claim 4, wherein the waveguide comprises a cladding, wherein the cladding comprises at least two openings for forming the laser light modification units for allowing the laser light to leave the waveguide and pass through the transparent material of least one of the first layer and the second layer.

8. The lighting apparatus of claim 4, wherein the waveguide comprises a cladding, where the cladding comprises at least two openings, wherein the first and second luminescent material are located at the at least two openings respectively, and the at least two openings and the first and second luminescent material form the laser light modification units, wherein the at least two openings and the first and second luminescent material are configured such that the modified light passes through the transparent material of at least one of the first layer and the second layer.

9. The lighting apparatus of claim 4, further comprising a crack detection unit for detecting a crack in at least one of the first layer and the second layer, and a control unit for controlling the laser, wherein the control unit is configured to switch the laser off if the crack detection unit has detected a crack in at least one of the first layer and the second layer, wherein the crack detection unit comprises an electrically conducting layer placed on one of the first layer and the second layer, and wherein the crack detection unit further comprises a circuit measuring a resistance of the conducting element.

10. The lighting apparatus of claim 4, wherein the waveguide comprises an optical fiber and the first luminescent material and the second luminescent material are placed on the optical fiber.

11. A method of producing a lighting apparatus comprising the acts of:

providing at least two laser light modification units for modifying laser light to modified light, a laser for emitting the laser light that is to be directed along a longitudinal axis of the lighting apparatus to luminescent material of the at least two laser light modification units, a first layer and an opposing second layer, and an intermediate transparent layer disposed between the first layer and the second layer, wherein a first laser light modification unit of the at least two laser light modification units comprises a first luminescent material for emitting a first luminescent light and a second laser light modification unit of the at least two laser light modification units comprises a second luminescent material for emitting a second luminescent light, the first luminescent light and the second luminescent light being the modified light when illuminated by the laser light, wherein at least one of the first layer and the second layer comprises a transparent material being transparent to the modified light, wherein the at least two laser light modification units are configured to allow the modified light to pass through the transparent material, wherein only the first luminescent material and the second luminescent material protrude in a transverse direction transverse to the laser light and to the longitudinal axis, and wherein a first protruding length of the first luminescent material is different from a second protruding length of the second luminescent material, wherein the first length and the second protruding length are a length of protrusion into the laser light along the transverse direction of the laser light; and arranging the first and second luminescent material of the at least two laser light modification units, the laser, the first layer and the second layer such that the laser light modification units are arranged between the first layer and the second layer, such that the at least two laser light modification units are simultaneously illuminatable by the laser light and the laser light is directable to the at least two laser light modification units for generating the modified light, and that the modified light is allowed to pass through the transparent material, wherein the intermediate transparent layer comprises one of gas and liquid.

12. The method of claim 11, further comprising the acts of:
detecting a crack in at least one of the first layer and the second layer by a crack detection unit; and
controlling the laser to switch the laser off if the crack detection unit has detected a crack in at least one of the first layer and the second layer,
wherein the crack detection unit comprises an electrically conducting layer placed on one of the first layer and the second layer, and wherein the detecting act measures a resistance of the conducting element.

13. A lighting apparatus comprising:
laser light modification units configured to modify laser light to modified light, wherein a first laser light modification unit of the laser light modification units comprises a first luminescent material for emitting a first luminescent light and a second laser light modification unit of the laser light modification units comprises a second luminescent material for emitting a second luminescent light, the first luminescent light and the second luminescent light being the modified light when illuminated by the laser light;

a laser for emitting the laser light that is to be directed along a longitudinal axis of the lighting apparatus to the first and second luminescent material of the laser light modification units;

a first layer and an opposing second layer;

an intermediate transparent layer disposed between the first layer and the second layer to form a laminate; and a waveguide arranged in the intermediate transparent layer, wherein the waveguide comprises a cladding and an optical fiber, and the first luminescent material and the second luminescent material are placed on the optical fiber, and wherein the cladding comprises openings for forming the laser light modification units for allowing the laser light to leave the waveguide and pass through a transparent material of least one of the first layer and the second layer.

14. The lighting apparatus of claim 13, wherein the first luminescent material and the second luminescent material are placed on a surface of one of the first layer and the second layer.

15. The lighting apparatus of claim 13, wherein the transparent material is transparent to the modified light, and wherein the intermediate transparent layer comprises one of gas and liquid.

16. A lighting apparatus comprising:

laser light modification units configured to modify laser light to modified light, wherein a first laser light modification unit of the laser light modification units comprises a first luminescent material for emitting a first luminescent light and a second laser light modification unit of the laser light modification units comprises a second luminescent material for emitting a second luminescent light, the first luminescent light and the second luminescent light being the modified light when illuminated by the laser light;

a laser for emitting the laser light that is to be directed along a longitudinal axis of the lighting apparatus to the first and second luminescent material of the laser light modification units;

a first layer and an opposing second layer;

an intermediate transparent layer disposed between the first layer and the second layer to form a laminate;

a waveguide arranged in the intermediate transparent layer;

a further waveguide;

beam splitting elements configured to divide the laser light of the laser into two laser beams for illuminating a first group of the laser light modification units of the waveguide and a second group of the laser light modification units of the further waveguide; and a coupling unit configured to couple the two laser beams into one the waveguide and the further waveguide such that the waveguide and the further waveguide are independently addressable, wherein the waveguide comprises a cladding, and wherein the cladding comprises openings for forming the laser light modification units for allowing the laser light to leave the waveguide and pass through a transparent material of least one of the first layer and the second layer.

* * * * *